UNITED STATES PATENT OFFICE.

JULIUS BAUR, OF NEW YORK, N. Y.

IMPROVED PROCESS FOR LINING BARRELS FOR HOLDING OIL, &c.

Specification forming part of Letters Patent No. 46,988, dated March 28, 1865.

*To all whom it may concern:*

Be it known that I, JULIUS BAUR, of the city, county, and State of New York, have invented a new and useful Process or Method of Lining and Treating Barrels and Packages for Containing Petroleum, Alcohol, and other Articles; and I hereby declare that the following is a full, clear, and exact description of the same.

This lining is particularly intended for preventing leakage and evaporation in petroleum and alcohol barrels and packages; but it can be used with advantage for kegs, casks, or other receptacles designed to contain paints, oils, wines, liquors, and other articles.

My invention consists in coating any desired portion of the inside or outside, or of both the inside and outside, of a barrel, cask, package, or other receptacle with soluble glass, so applied as to constitute a permanent lining impervious to and capable of preventing leakage and evaporation of oils and other substances, and not liable to be destroyed or injured by cracking off.

It further consists in forming such a coating by means of soluble glass, as just mentioned, in combination with subjecting said soluble glass to the action of sulphate of iron or any other salt of any metal for the purpose of removing those constituents of the glass which are soluble in water, so that the articles containing water may be retained in the barrel, cask, package, or other receptacle treated without injury to the coating and without leakage or evaporation.

In carrying out my invention I first take soluble glass, which may be silicate of potash or silicate of soda, and may be either in a dry or already dissolved state. If dry, which is the form in which I prefer it, I mix it with water, and if already dissolved I dilute it, if necessary, with water until it is in proper condition to make a solution of a consistence of about from 13° to 15° Baumé, when fully prepared for use. After it is thus mixed or diluted, as the case may be, I subject it to a steam or other heat of about 212°, in suitable vessels, until the solution has become of the consistence mentioned. I then fill with this soluble glass the barrel or other article to be treated, or preferably dip into the solution the barrel or other article, and boil the latter in it for about half an hour, or until the article appears to be fully impregnated with the solution. I then, while the pores of the article are still open, treat it with a warm solution of sulphate of iron, or of one of the other metallic salts mentioned, and I prefer that this solution should be of about one to one and one-half pound of the salt to a gallon of water, and I also prefer that its temperature should be about from 180° to 212° Fahrenheit. The treatment with this solution consists in pouring a sufficient quantity of it into the barrel or other article and violently agitating the latter, and it should be performed quickly, and the solution then removed in order to prevent it from acting too strongly upon the constituents of the soluble glass. I then let the barrel or other article dry, and after it is dry I prefer to apply to the outside of it a second solution of soluble glass, of a consistence about 25° to 30° Baumé, and of a temperature of, say, 90° Fahrenheit, which application may be made either by dipping the barrel into the solution or by spreading it over the barrel with a brush. The barrel is then permitted to dry, after which it will be ready for use.

Silicate of potash is composed of sand and potash, and silicate of soda of sand and soda. The silicic acid of the sand is in combination with the alkali, thus forming a salt. Now, when the solution of sulphate of iron or other metallic salt is presented to this silicate of potash or soda, the silicic acid of the latter combines with the iron or other metallic base, and a precipitation takes place, forming a salt which is a silicate of iron, or other base, according to the character of the metallic salt employed. At the same time the sulphuric or other acid of the sulphate of iron or other metallic salt combines with the potash or soda and forms a sulphate, or chloride, or hydrate, as the case may be, of potash or soda, and is washed away in solution during the treatment with the sulphate of iron or other salt above mentioned, thus leaving the barrel or other article coated with the silicate of iron or other metal. This siloxide is insoluble in any liquid except acids, and when applied in the manner mentioned to the substance of the barrel it petrifies it and renders it impervious to petroleum, benzine, oils of every kind, alcohol, wines, whisky, and many other articles, thus forming what may with sufficient accuracy be termed an "hermetical" package, which will be found of very great value for many purposes in the arts.

The silicate of potash or of soda is soluble in water, and the excess of alkali in such silicate is soluble in alcohol, and therefore when the barrel is designed to hold alcohol or to hold articles containing water, the treatment with sulphate of iron or other metallic salt must be adopted, because it washes away, as already stated, the soluble constituents of the silicate and leaves only those which are insoluble in water or alcohol; but if the barrel is intended for petroleum, benzine, or oils which do not contain water, the treatment with the metallic salt may be omitted, and in this case I prefer to dip the barrel two or three times into the above-mentioned hot solution of soluble glass of about 25° to 30° Baumé, and let it dry after each dipping. If the soluble glass should contain too much alkali, so that the metallic salt employed would not by itself remove it all, leaving it a little sour, I prefer to put a drop or two, or as much more as may be needful, of sulphuric acid with the metallic salt before I treat the glass with it. This increased amount of acid combines with the excess of alkali and removes it. Instead of sulphate of iron, I can with advantage employ sulphate of zinc, sulphate of manganese, chloride of iron, chloride of zinc, or chloride of manganese; but all the other metallic salts except these, though capable of being used, are too expensive to be practically available. If the solution of soluble glass be suffered to dry thoroughly into the substance of the barrel or other article treated, the latter will be found capable of holding without leaking or evaporating the alcohol of commerce, as well as wines or whisky, without the use of sulphate of iron or other salt; but the latter produces a better result, unless, as before stated, the barrel is merely for petroleum, benzine, or other oils which do not contain water. I may also add that the above-mentioned second coating of the outside of the article treated will be found to render the same fire-proof.

When old alcohol, wine, whisky, or oil barrels are to be subjected to this process, they should first be so treated as to thoroughly dry them out.

This invention will be found especially desirable for alcohol, whisky, and wines, because the coating will not impart any taste to the contents of the barrel.

It will be obvious that packages intended for fruit preserved in brandy, and for analogous articles, may be advantageously treated by this process.

I am aware that soluble glass has been proposed as a coating for barrels and other vessels; but, so far as I am informed, all attempts to apply it practically for this purpose have failed. This failure I deem due to the fact that the solution has always heretofore been prepared too thick to remain for any considerable length of time without cracking off, and thereby rendering the coating worthless. I therefore take care that it is not made too strong, and I have found that a consistence varying between 10° and 33° Baumé will answer the purpose. Below 10° the solution will be too weak to be serviceable, and above 33° it is so strong as to be liable to crack off.

I believe I am the first to successfully apply soluble glass in any process to barrels or other vessels for the purpose of forming a coating to prevent leakage or evaporation.

It is of course obvious that the manner in which soluble glass acts to produce this effect, whether employed alone or in any way whatever in connection with any other things, is by impregnating, and, as it were, petrifying, the substance of the article treated to a greater or less degree, according as it is used alone, or as its normal action is affected by the union of other matters; and I consider it new to apply soluble glass, whether alone or otherwise, to produce this impregnation.

Having thus described my invention, what I claim, and desire to secure by Letters Patent, is—

1. The above-described process, substantially as set forth, of lining or coating barrels and other articles designed to contain petroleum, benzine, oil, ground lead, or paints, and other similar substances.

2. The above-described process, substantially as set forth, of lining or coating barrels and other articles designed to hold alcohol, wines, whisky, and other substances which contain water.

3. The above-described process of lining or coating barrels or other receptacles designed to contain any of the hereinbefore-referred-to articles, when the soluble glass employed in such process is dried thoroughly into the substance of the barrel or other receptacle, substantially as set forth.

4. The employment of soluble glass, whether alone or in union with other matters, to impregnate or, as it were, petrify any article which is designed to be secured against leakage or evaporation.

JULIUS BAUR

Witnesses
S. D. COZZENS,
JAS. BUTLER.